May 15, 1945. A. H. HOUGHTON 2,375,846
CORN HARVESTER
Filed Sept. 28, 1943 4 Sheets-Sheet 2
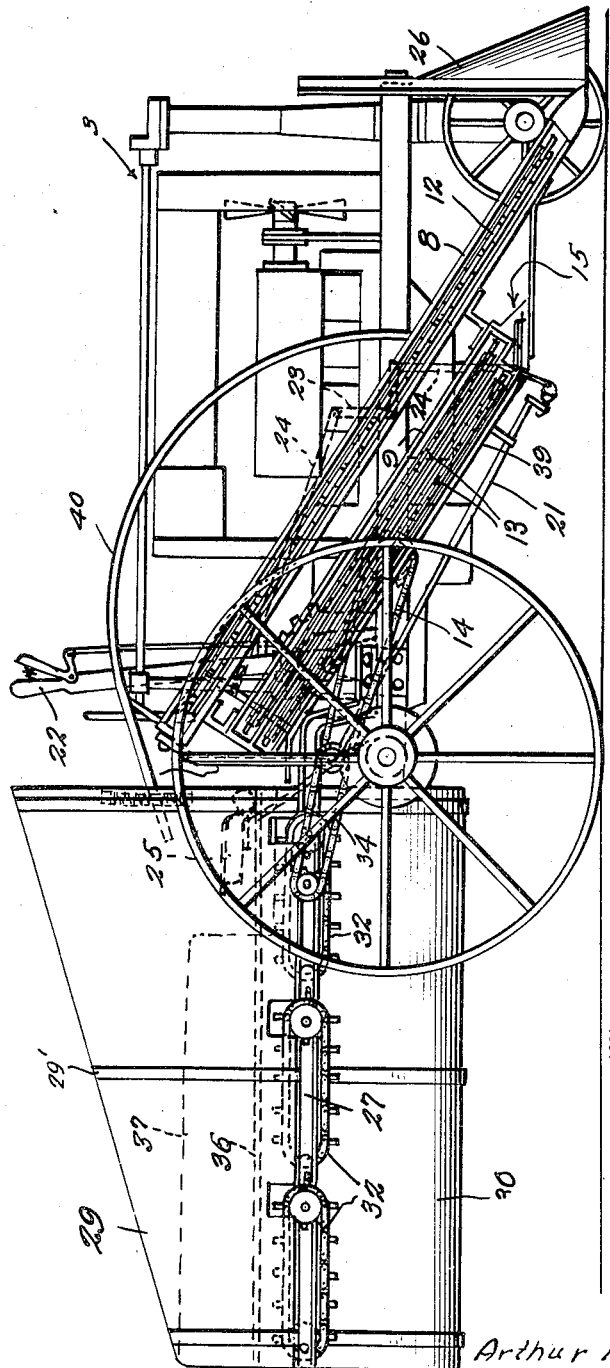
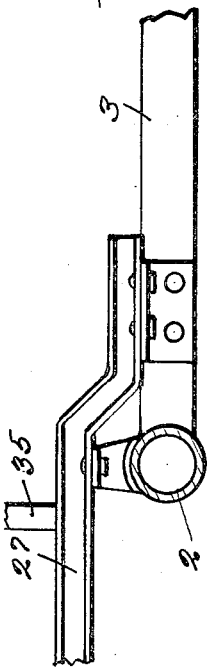
Inventor
Arthur H. Houghton
By Clarence A. O'Brien
and Harvey B. Jacobson
Attorneys Inventor
Arthur H. Houghton By Clarence A. O'Brien
and Harvey B. Jacobson
Attorneys

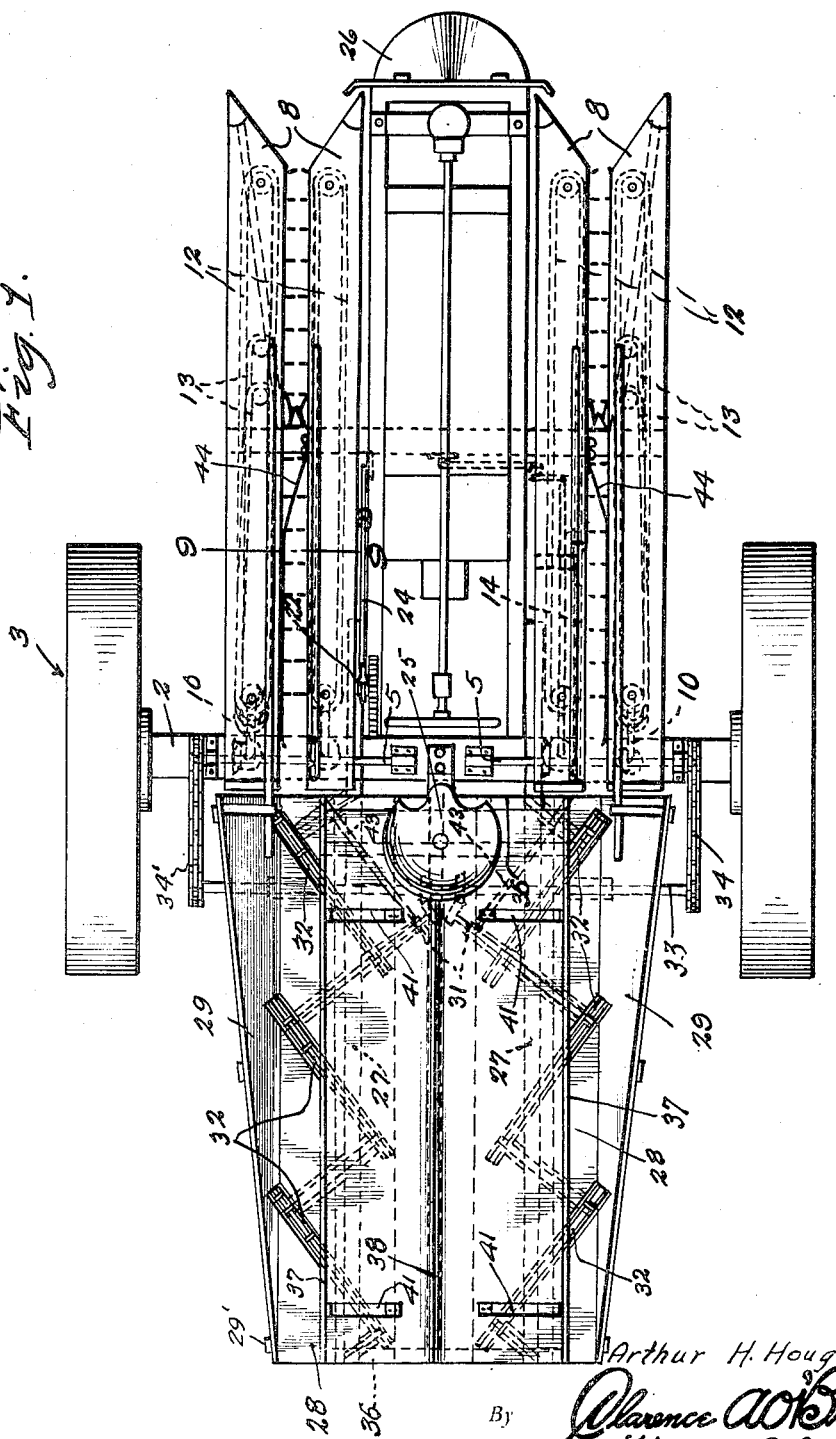

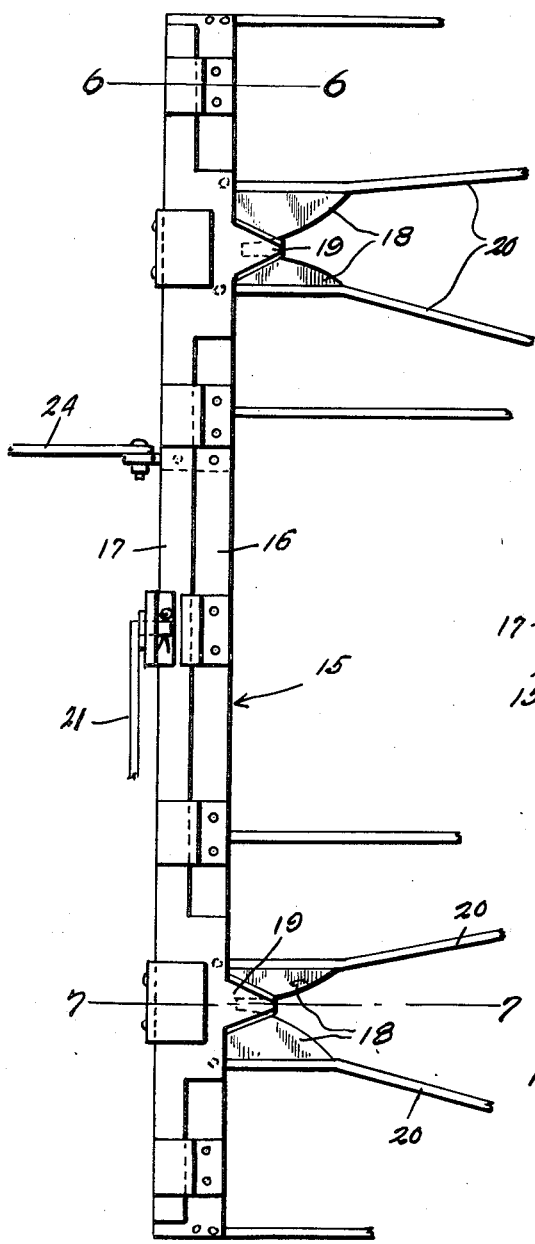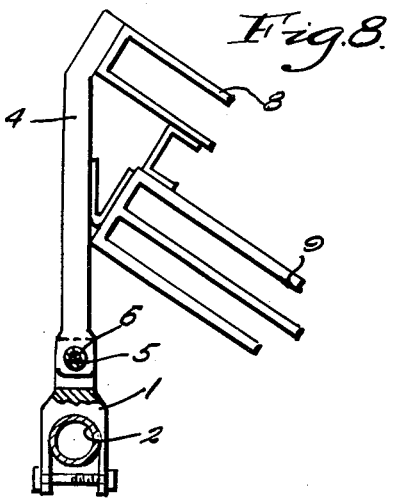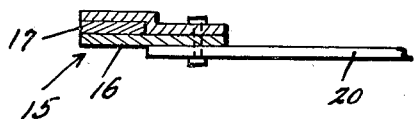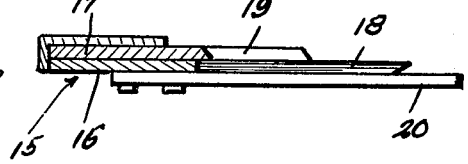

Patented May 15, 1945

2,375,846

UNITED STATES PATENT OFFICE 2,375,846
CORN HARVESTER

Arthur H. Houghton, Elgin, Ill.

Application September 28, 1943, Serial No. 504,171

2 Claims. (Cl. 56—15)

The present invention relates to new and useful improvements in corn harvesters, and has for one of its important objects to provide, in a manner as hereinafter set forth, an apparatus of this character which is adapted to be expeditiously mounted for operation on a conventional farm tractor and driven from the side power take-off thereof.

Another very important object of the invention is to provide a two-row tractor mounted corn harvesting machine which is adapted to start operating at any desired point in a field of corn.

Still another very important object of the invention is to provide a two-row tractor mounted harvesting machine of the character described which embodies novel means for cutting and elevating the corn stalks.

Other objects of the invention are to provide a corn harvesting machine of the character set forth which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a top plan view of a corn harvesting machine constructed in accordance with the present invention.

Figure 2 is a view in side elevation thereof.

Figure 5 is a plan view of the sickle.

Figures 6 and 7 are cross-sectional views, taken substantially on the lines 6—6 and 7—7, respectively, of Figure 5.

Figure 8 is a detail view in side elevation of one of the pivoted supporting members, showing the axle housing of the tractor in section.

Figure 3:
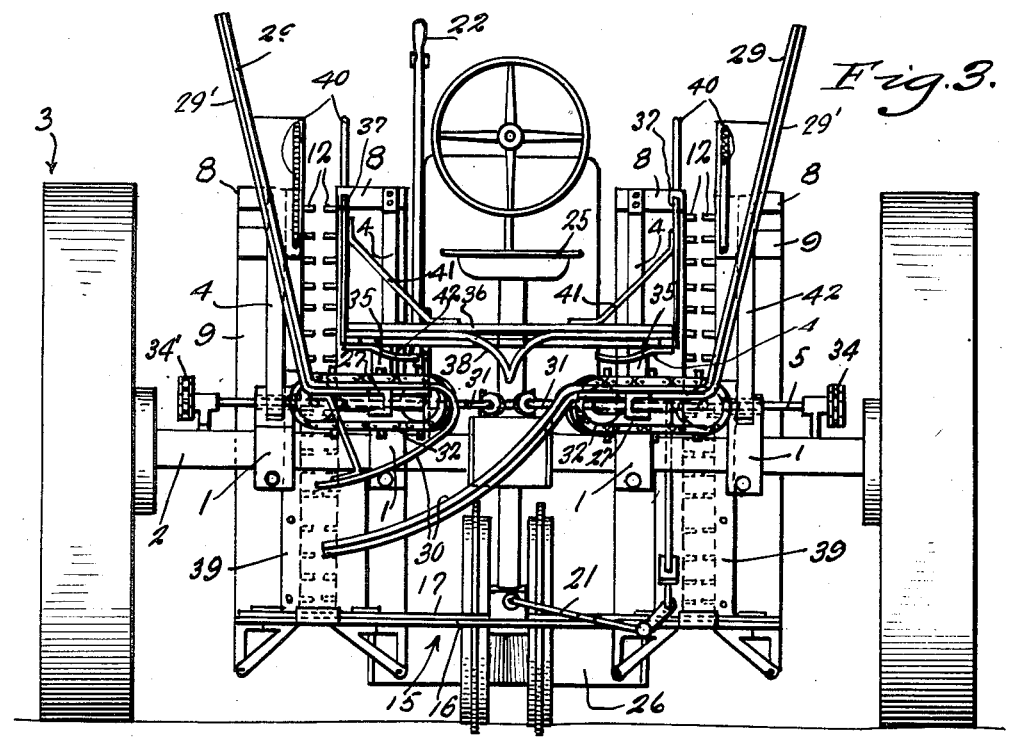
Figure 3 is a rear elevational view.
Figure 4:
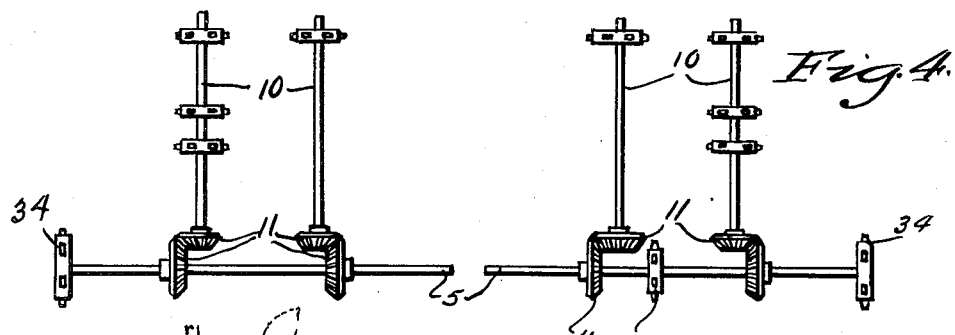
Figure 4 is an elevational view of the drive shafts for the stalk conveying chains.
Figure 9:
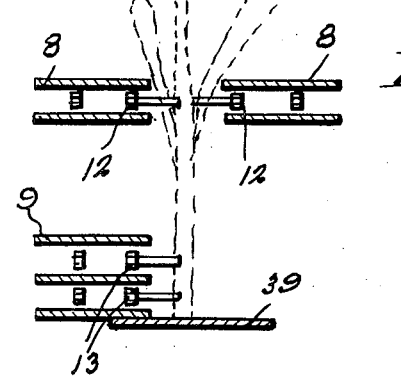

Figure 9 is a cross-sectional view, taken substantially on the line 9—9 of Figure 1.

Figure 10 is a cross-sectional view through the rear axle housing of the tractor, showing the mounting of one of the supporting members of the rear portion of the apparatus thereon.

Referring now to the drawings in detail, it will be seen that the embodiment of the apparatus which has been illustrated comprises pairs of substantially U-shaped brackets 1 (see Fig. 8) which are removably secured on the axle housing 2 of a tractor 3. Pairs of posts 4 are mounted for swinging movement in a vertical plane on the brackets 1 through the medium of a pair of shafts 5, bushings or bearings 6 being provided for said shafts. Forwardly inclined frames 8 are mounted on the upper portions of the pairs of posts 4. Mounted on the outermost posts 4 are frames 9 which parallel the frames 8 but which are comparatively short. Inclined shafts 10 are journaled in the rear end portions of the frames 8 and 9, said shafts 10 being driven from the shafts 5 through beveled gears 11. The shafts 10 drive gatherers 12 which are operable in the upper frames 8. The outermost shafts 10 also drive conveyors 13 which are operable in the frames 9. One of the shafts 5 is driven from the side power take-off of the tractor 3 through a chain and sprocket connection 14.

Extending transversely beneath the tractor 3 between the forward ends of the comparatively short frames 9 is a sickle 15. As best seen in Figure 5 of the drawings, the sickle 15 includes a stationary lower bar 16 having mounted thereon a reciprocating bar 17. Coacting stationary and moving cutters 18 and 19, respectively, are mounted on the bars 16 and 17. Guides 20 extend forwardly from the stationary cutters 18. A suitable connection 21 drives the reciprocating bar 17 of the sickle 15 from one of the shafts 5. The assembly is connected to a hand lever 22 for swinging adjustment in a vertical plane by means including a bell crank lever 23 and rods 24 on the tractor 3. The hand lever 22 is located adjacent the operator's seat 25 of the tractor 3 for convenient operation. A lifter 26 on the front of the tractor 3 picks up the stalks and directs them into the gatherers 12.

Rigidly mounted on the rear portion of the tractor 3 and projecting rearwardly therefrom are spaced, parallel supporting bars 27. Platforms 28 are mounted on the bars 27 for receiving the corn stalks from the gathering and conveying chains 12 and 13, said platforms including inclined outer walls 29, suitably reinforced as by bands 29'. The inner portions of the platforms 28 are formed to provide a downwardly and laterally curved discharge chute 30 which extends the length of said platforms.

Shafts 31 are journaled diagonally in the bars 27. The shafts 31 drive endless conveyors 32 which are operable diagonally on the platforms 28. A transverse shaft 33 drives the shafts 31. The shaft 33, in turn, is driven from one of the shafts 5 through a chain and sprocket connection 34. A similar connection 34' drives the other shaft 5 from the shaft 33.

Supports 35 rise from the forward portions of the arms 27. A frame structure 36 is mounted on the supports 35 and projects rearwardly therefrom. A guide 38 of substantially V-shaped cross-section is mounted on the frame structure 36 over the platforms 28 for paralleling the stalks of corn from the conveyors 32 and for directing said stalks downwardly into the chute 30. Vertical walls 37 rise from the side portions of the frame structure 36 in spaced relation to the walls 28. Braces 41 are provided for the walls 37.

It is thought that the operation of the apparatus will be readily apparent from a consideration of the foregoing. Briefly, the tractor 3 is driven across the field between the two rows to be cut. The sickle 15 cuts the stalks which are conveyed therefrom up inclined plates 39 (see Fig. 9) by the endless chains 12 and 13. Throat springs 44 are provided for pressing the stalks outwardly in the conveyors. Guides 40 are provided on the upper frames 8 between which the upstanding stalks pass. From the upper ends of the inclined plates 39 the stalks are caused to fall longitudinally between the walls 29 and 37 onto the platforms 28. The conveyors 32 move the stalks rearwardly and inwardly on the platforms 28 into the discharge chute 30. Springs 42 are mounted beneath the frame 36 for pressing the stalks downwardly on the conveyors 32. Diagonal guides 43 for the stalks are provided between the forward portions of the platforms 28 and the guide 38. If desired, a suitable binder may receive the stalks from the platforms 28. Or, a conveyor may load the stalks into a wagon accompanying the machine.

It is believed that the many advantages of a corn harvester constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. A corn harvester comprising posts mounted for swinging movement in a vertical plane on a tractor, endless inclined gatherers and conveyors mounted on the posts, a sickle extending between the conveyors beneath the tractor, means for raising and lowering the sickle, a pair of spaced parallel platforms mounted on the tractor for receiving the corn stalks from the conveyors, additional conveyors on the platforms for discharging the stalks therebetween, and common means operatively connecting the first and second named conveyors and the sickle to a power take-off of the tractor.

2. A corn harvester comprising a sickle for mounting on a tractor, means on opposite sides of the tractor for conveying the stalks from the sickle, a pair of spaced parallel platforms extending rearwardly from the tractor and adapted to receive the stalks from the conveying means, conveyors on the platforms for discharging the stalks therebetween, and a substantially V-shaped guide extending rearwardly from the tractor for directing the stalks downwardly between the platforms.

ARTHUR H. HOUGHTON.